United States Patent [19]
Greig

[11] Patent Number: 5,888,331
[45] Date of Patent: Mar. 30, 1999

[54] JOINING BODIES OF THERMOPLASTIC MATERIAL

[75] Inventor: John Martyn Greig, Whitely Bay, United Kingdom

[73] Assignee: BG plc, London, England

[21] Appl. No.: 777,402

[22] PCT Filed: Mar. 31, 1994

[86] PCT No.: PCT/GB94/00709

§ 371 Date: Nov. 30, 1994

§ 102(e) Date: Nov. 30, 1994

[87] PCT Pub. No.: WO94/22661

PCT Pub. Date: Oct. 13, 1994

Related U.S. Application Data

[63] Continuation of Ser. No. 347,313, Nov. 30, 1994, abandoned.

[30] Foreign Application Priority Data

Apr. 1, 1993 [GB] United Kingdom ............. 93 06784

[51] Int. Cl.$^6$ ............. B29D 23/00; B28B 21/64
[52] U.S. Cl. ............. 156/187; 156/188; 156/272.2; 156/309.9
[58] Field of Search ............. 156/156, 272.2, 156/187, 188, 309.9, 432

[56] References Cited

U.S. PATENT DOCUMENTS

| | | | |
|---|---|---|---|
| 2,723,705 | 11/1955 | Collins | 156/188 X |
| 4,010,054 | 3/1977 | Bradt | 156/187 |
| 4,419,304 | 12/1983 | Ficke et al. | 264/25 |
| 4,898,637 | 2/1990 | Starlinger-Huemer | 156/187 |
| 5,177,340 | 1/1993 | Zaffiro . | |

FOREIGN PATENT DOCUMENTS

| | | |
|---|---|---|
| 0 159 169 | 10/1985 | European Pat. Off. . |
| 0421607 | 4/1991 | European Pat. Off. . |
| 1506163 | 11/1967 | France . |
| 2818376 | 11/1978 | Germany . |
| 6510316 | 8/1965 | Netherlands . |
| 9300212 | 1/1993 | WIPO . |

Primary Examiner—Michael W. Ball
Assistant Examiner—Sam Chuan Yao
Attorney, Agent, or Firm—Larson & Taylor

[57] ABSTRACT

A pipe of polyethylene is reinforced by two layers of polyethylene tape wound around the pipe in opposite directions under tension. The pipe contains carbon black and the layers are unpigmented and free from fillers and are transparent to infra-red radiation to which the first major surface is exposed. The radiation is in the near infra-red region and has a substantial part of the radiant energy of a wavelength of less than 2.5 micrometers. Very little radiation is absorbed by the layers but a very high absorption occurs in the outer surface of the pipe. This causes the interface between the second major surface of the layer and the first major surface of the pipe and between the second major surface of the layer and the first major surface of the layer to reach temperatures at which fusion welding in the layers welds them together and welds the layer and the pipe together.

8 Claims, 2 Drawing Sheets

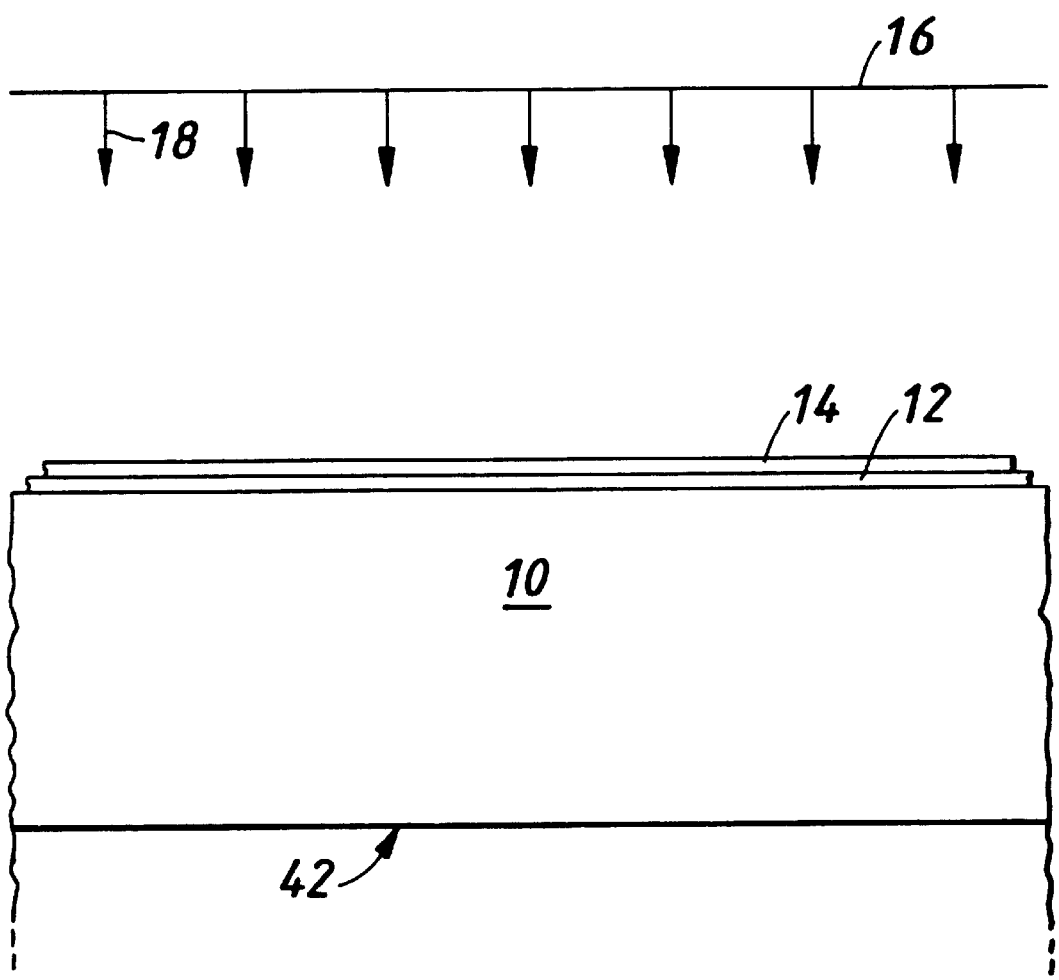

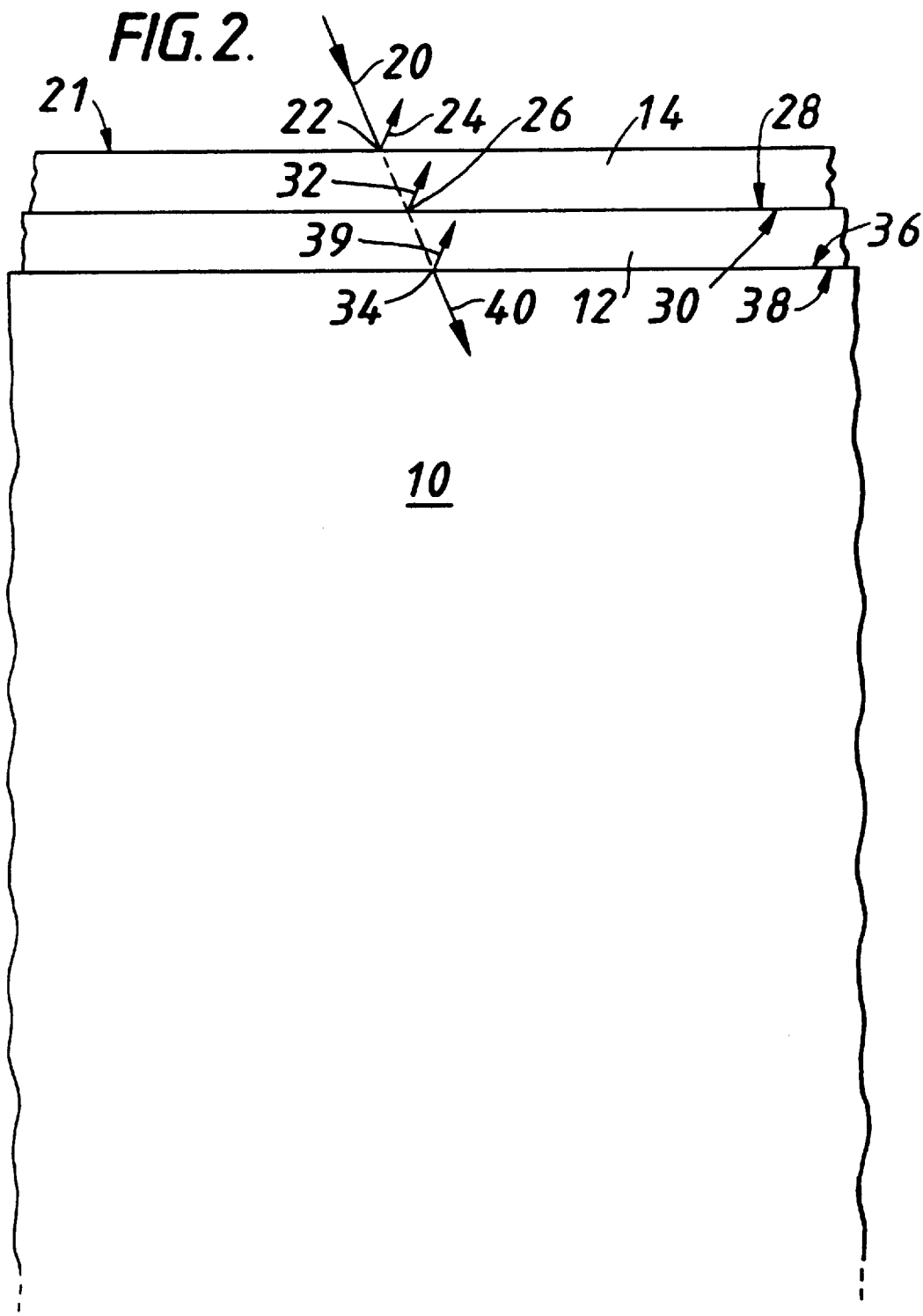

JOINING BODIES OF THERMOPLASTIC MATERIAL

This application is a continuation of application Ser. No. 08/347,313 filed Nov. 30, 1994 now abandoned.

FIELD OF THE INVENTION

The invention relates to methods of joining bodies of thermoplastic material.

PRIOR ART

British patent specification No.GB-A-1147477 discloses a method of causing a heat-recoverable article to recover, the article comprising a tubular sleeve of a material having the property of elastic memory and a fusible insert positioned within the sleeve, which comprises irradiating the sleeve and the insert with light energy, the material and the wavelength band of the energy being such that the material absorbs a fraction of the energy and transmits the remainder to the insert, the transmitted energy being sufficient to raise the insert to its fusing temperature and the fraction absorbed by the material being sufficient to raise the material to its recovery temperature.

The fusible insert is a solder insert composed of 63% tin and 37% lead and the sleeve was cross-linked polymeric material having elastic memory. On heating, the sleeve recovered and shrank and firmly gripped the electrical connectors which the sleeve encircled while the solder melted and flowed and formed a soldered connection between the electrical conductors.

The specification states that: " . . . where the - - - sleeve itself is transparent to infra-red radiation, an absorber can be added to it, for example, carbon black . . . can be added to polyethylene".

The specification was not concerned to join two bodies together by a fusion weld.

The aim of the method described in GB-A-1147477, apart from melting the solder insert, was to cause the sleeve to absorb a sufficiently large fraction of the radiation to raise the material to its recovery temperature. The specification states that the sleeve was heated for 0.75 seconds and reached its recovery temperature of 347° F. (175° C.).

SUMMARY OF THE INVENTION

The aim of the present invention is to join bodies of thermoplastic material, by means of fusion welding using radiation in the near infra-red region.

The invention is particularly, though not exclusively, concerned with joining layers of reinforcement to a pipe. Reinforced thermoplastic pipe can be manufactured by applying layers of fibre reinforced thermoplastic tape or film onto the pipe. The tapes are wound on the pipe in pairs, the two tapes in a pair being of opposite hand to balance the torsional forces when the pipe is conveying a product subjected to pressure. Each tape is wound under tension and the applied tension holds the tape and the pipe together in order to ensure that a fusion welded joint is established between them when they are subsequently heated by irradiation. It will be understood that the first tape will be applied directly to the pipe. The second tape will be applied on top of the first tape and the tension in the second tape will provide the force required to urge the second tape, and the underlying first tape, together in order to effect a fusion welded joint between them.

If necessary, a second pair of tapes can be wound on top of the first pair of tapes and, if necessary, further pairs of tapes can be wound on top of those.

Typically, each tape is composed of polyethylene and contains a number of reinforcing fibres extending lengthwise of the tape, the fibres being distributed across the width of the tape. Each fibre may be composed of a large number of fine filaments, for example, of aramid material.

In another application, the invention is used to join a tape or tapes containing reinforcement to a pipe, the tape and reinforcement extending longitudinally along the pipe. In this application, the reinforcement is not reinforcing the pipe in the radial sense, to resist internal pressure, but instead is reinforcing the pipe to resist longitudinal forces which may be exerted upon the pipe. For example, if a very long length of thermoplastic pipe is required to be pulled into a host metallic pipe in order to provide resistance to corrosion, for example, very great tensile forces would arise in the thermoplastic pipe, which may cause it to deform and/or break.

The invention is not limited to joining reinforcement to pipe. The invention is applicable to joining a body of thermoplastic material, such as a layer of thermoplastic material to another body of thermoplastic material. For example, that other body may be a plane layer. Successive layers of thermoplastic material may be joined together or several layers may simultaneously be joined. The invention is not limited to joining fibre reinforced tape.

In carrying out the method, a first body of thermoplastic material which, for example, may be a pipe has superimposed upon it a second body of thermoplastic material which, for example, may be a reinforcing layer. The layer has first and second major external surfaces separated by the thickness of the layer. The bodies are superimposed so that the second major surface of the layer is adjacent the major external surface of the pipe.

The first major surface of the layer is subjected to exposure to radiation in the near infra-red of a wave length with a substantial part less than 2.5 micro-meters for polyethylene, for example, the wave length of the radiation being chosen so that the layer is highly transparent to the radiation. The pipe is chosen to be an absorber of a major proportion of said radiation.

The layer transmits a large proportion of the radiation and the pipe absorbs that radiation and rapidly heats up to the temperature (say 140° C. for polyethylene) necessary for joining the layer to the pipe by fusion welding.

In an alternative way of carrying out the invention, the pipe (for example) has a layer superimposed upon it and then another layer is superimposed upon the first layer. The outermost layer is subjected to exposure to radiation as before. The rise in temperature of the pipe, combined with the heat produced by partial absorption of the beam and the reflections of the beam in the layers is sufficient to cause the adjoining surfaces of the pipe and the innermost layer and also the adjoining surfaces of the two layers to reach temperatures necessary for joining the innermost layer to the pipe, and to join the two layers by fusion welding. The degree of absorption or transparency of the layer(s) may be controlled by the addition of energy absorbing material e.g. carbon black or the choice of wavelength.

It is convenient in this case to refer to the pipe as the "first body", the innermost layer which is superimposed directly on the pipe as the "second body" and the outermost layer as the "third body".

According to the invention, a method of joining first and second bodies of thermoplastic material, said second body being a layer superimposed on the first body, said layer having a first and a second major external surface separated by the thickness of the layer, said layer being superimposed so that the second major surface of the layer is adjacent a major external surface of the first body comprises subjecting said first major surface of said layer to exposure to radiation in the near infra-red region of a wavelength chosen so that the layer is transparent to said radiation and said first body at least at or adjacent its said major surface being an absorber of said radiation so that said two adjacent major surfaces are caused to reach a temperature at which they are joined by fusion welding, said two adjacent major surfaces being held together.

DESCRIPTION OF PREFERRED EMBODIMENTS

An embodiment of the invention will now be described by way of example with reference to the accompanying drawings, in which:

FIG. 1 is a part-vertical section through part of a pipe wall having two layers wrapped around it and showing a source of radiation; and FIG. 2 is an enlargement of part of the pipe wall and layers shown in FIG. 1.

FIG. 1 shows a pipe wall 10 (which in this example forms the body of thermoplastic material) composed of polyethylene and containing carbon black in sufficient quantity to make the pipe 10 an efficient absorber of radiation in the near infra-red region of a frequency less than 2.5 micrometers. In a modification (not shown) only an outermost layer of the pipe wall 10 contains carbon black. The pipe 10 (the first body) has superimposed on it an innermost layer 12 of reinforcement (the second body) and an outermost layer 14 of reinforcement (the third body) is superimposed on the layer 12. The layer 12 and the layer 14 are each composed of polyethylene and each consists of a tape which is wound progressively under tension, at an angle to the length of the pipe 10. The direction of winding of one tape is opposite to the direction of winding of the other tape. Each tape preferably contains a number of reinforcing fibres extending lengthwise of the tape, the fibres being evenly spaced across the width of the tape. Each fibre is preferably composed of a large number of fine filaments, preferably of aramid material. Each tape, for example, is approximately 1 millimetre thick.

The pipe 10 shown in FIG. 1 has been wound with the tapes 12, 14 using a machine (not shown) and the pipe 10 now passes longitudinally through an oven 16 in which sources of infra-red radiation 18 are mounted distributed around the pipe 10. The pipe 10 may be moving longitudinally at, say, 3–6 metres per minute, for example, and the oven 16 is long enough for the layers 12, 14 to reach temperatures at which fusion welding to each other and to the surface of the pipe takes place.

The sources 18 produce radiation in the near infra-red region having a substantial part of the radiant energy of a wavelength less than 2.5 micrometers. For example, the sources may be quartz tubes or quartz lamps with peak wavelengths at about 2.3 micrometers; or preferably at about 1.2 micrometers. The tapes 12,14 preferably do not contain pigments or fillers to maximise transparency to the radiation used.

As shown in FIG. 2 a beam 20 of radiation is shown striking the exposed major surface 21 of the second layer 14 at 22. A relatively small proportion of the radiation 24 is reflected at 22 from the exposed surface 21. The radiation continues on its way through the layer 14 and strikes the interface at 26, where the second major surface 28 of the layer 14 is immediately adjacent the first major surface 30 of the layer 12. It will be appreciated that the first and second major surfaces referred to above are separated by the thickness of the layer 14. A relatively small amount of radiation is absorbed by the tape 14.

Again, a relatively small amount of radiation 32 is reflected at 26 from the surface 30. The radiation continues on its way until it strikes the interface at 34, where the second major surface 36 of the layer 12 is immediately adjacent the first major surface 38 of the pipe 10. A relatively small amount of radiation 39 is reflected at 34 from the surface 36. Again, the first major surface 30 and the second major surface 36 of the layer 12 are separated by the thickness of the layer 12. A relatively small amount of radiation is absorbed by the first layer 12.

Beyond the point 34 as the radiation 40 travels within the pipe 10, the radiation is absorbed very quickly in a relatively short distance owing to the presence of carbon black or other energy absorbing material and produces a corresponding amount of heat. This causes the interface 36, 38 to rapidly reach the temperature at which the two surfaces, 36, 38 become joined by fusion welding.

The heat produced at the interface 36, 38 is also rapidly conducted back through the layer 12 to the interface 28, 30 which when combined with the heat produced by partial absorption of the beam 20, and reflections 32, 39 in the layers 14 12, causes the interface 28, 30 to rapidly reach the temperature at which the two surfaces 28, 30 become joined by fusion welding.

The two interfaces 36, 38 and 28, 30 are held together by the fact that the tapes 12, 14 are wound on the pipe 10. The tapes 12, 14 hold the adjacent surfaces at the interfaces together and so ensure that fusion welding takes place at the interfaces.

Relatively little heat is conducted to the second major surface 42 of the pipe 10 and accordingly there is no distortion of that surface due to heat. This is a distinct advantage of the use of the invention.

The first major surface 38 and the second major surface 42 of the pipe 10 are separated by the thickness of the pipe.

The description given with reference to FIGS. 1 and 2 generally also applies where only one layer is involved or where the layers are not wound upon a pipe, but are superimposed longitudinally along the pipe; or where the layer or layers are superimposed on a body other than a pipe. Of course, the pressure necessary for fusion welding to occur has to be applied to the interface or interfaces in place of the tension in the layer or layers as described above. This can be done, for example, by rolling the second body or the third body after irradiation; or by passing the interface or interfaces (where the layer or layers are superimposed on a pipe) through a die through which the pipe passes.

In a modification of the method (not shown), a first layer is superimposed on the first body (e.g. a pipe) and irradiated. While the first layer and the adjacent major external surface of the pipe are still hot, a second layer is superimposed upon the first layer and is exposed to heat. It is not necessary to expose the second layer to infra-red radiation, though that may be used. The second layer rapidly gains heat from the first layer and it is merely sufficient to ensure that the second layer is hot enough for a fusion weld to be formed between the two layers.

The pipe and its two layers are subsequently allowed to cool, the first layer being held against the pipe and the second layer being held against the first layer by the fact that the layers are wound upon the pipe. The first layer is joined to the pipe, and the two layers are joined, by fusion welds.

In any method according to the invention the transparency of the layer, or of one or other of the layers, to infra-red radiation may be adjusted by the inclusion in the layer or layers of pigment or other absorber. Preferably, the amount of pigment or other absorber used is ideally adjusted to create simultaneously the fusion temperature at each of the interfaces without causing overheating or degradation in the layer(s) or the pipe.

In principle any number of layers can be joined by fusion welding to a first body and to each other.

What is claimed is:

1. A method of fusion welding of a first and second layers of thermoplastic material to a thermoplastic pipe, said thermoplastic pipe having major internal and external surfaces separated by the thickness of the pipe, which comprises:

winding a first layer of thermoplastic material on a thermoplastic pipe under tension sufficient to urge said first layer under pressure against said pipe, said first layer having major internal and external surfaces separated by the thickness of the first layer, said first layer being superimposed on the pipe such that the internal surface of the first layer is pressed against the external surface of said pipe, an absorber of near infra-red radiation being at or adjacent the external surface of said pipe;

winding a second layer of thermoplastic material on said first layer under tension sufficient to urge said second layer against said first layer, said second layer having major internal and external surfaces separated by the thickness of the second layer, said second layer being superimposed on said first layer such that the internal surface of said second layer is pressed against the external surface of said first layer, and second layer being wound on said first layer in a winding direction which is opposite to the direction that said first layer is wound on said pipe, whereby said adjacent surfaces of said pipe and first layer and the adjacent surfaces of the first and second layers are pressed together due to the tension in said first and second layers; and subjecting the external surface of said second layer to radiation in the near infra-red region having a wavelength chosen so that the first and second layers are substantially transparent to said radiation and so that the radiation is absorbed by said radiation absorber, said radiation being sufficient to cause the adjacent surfaces of said pipe and first layer and the adjacent surfaces of said first and second layers to reach a temperature at which they are joined by fusion welding while under pressure due to the tension in said first and second layers, said pressure being sufficient to cause the first layer to be fusion welded to the pipe and to cause the second layer to be fusion welded to the first layer without causing damage to the pipe due to excessive heat.

2. A method according to claim 1 wherein each of said first and second layers comprises tape carrying a number of reinforcing fibres extending lengthwise of the tape and being evenly spaced across the tape, each of said tapes being progressively wound at an angle to the length of the pipe.

3. A method according to claim 1 in which at least one of the first and second layers contains an absorber to adjust the transparency to said radiation of said at least one of the layers.

4. A method according claim 1 wherein said pipe and said first and second layers are composed of polyethylene, said absorber comprises carbon black, and wherein a substantial part of said radiation has a wavelength less than 2.5 micrometers.

5. A pipe made by a method according to claim 1.

6. A method of fusion welding at least one layer of thermoplastic material to a thermoplastic pipe, said pipe having major internal and external surfaces separated by the thickness of the pipe, comprising:

positioning at least one thermoplastic tape axially on said pipe, said at least one tape having major internal and external surfaces separated by the thickness of said tape, the internal surface of said tape being in contact with the external surface of said pipe, an absorber of near infra-red radiation being at or adjacent the external surface of said pipe;

subjecting the external surface of said tape to radiation in the near infra-red region having a wavelength chosen so that said tape is transparent to said radiation and so that the radiation is absorbed by said absorber, said radiation being sufficient to cause the external surface of said pipe and the internal surface of said tape to reach a fusion welding temperature which enables the tape and pipe to be fusion welded; and pressing the tape against the pipe while the internal surface of the tape and the external surface of the pipe are at said fusion welding temperature to fusion weld said tape to said pipe without resulting in damage to the pipe due to excessive heat.

7. A method according to claim 6 in which said tape carries a number of reinforcing fibres extending lengthwise of the tape and being evenly spaced across the tape.

8. A pipe made by a method according to claim 6.

* * * * *